US008711439B2

(12) United States Patent
Nacman et al.

(10) Patent No.: US 8,711,439 B2
(45) Date of Patent: Apr. 29, 2014

(54) HIGH PRODUCTIVITY SINGLE PASS SCANNING SYSTEM

(75) Inventors: Aron Nacman, Rochester, NY (US); Seth H. Groder, West Henrietta, NY (US); John C. Guarrera, Rochester, NY (US); Dawn Marie LaPietra, Rochester, NY (US); Whynn Victor Lovette, Ontario, NY (US); Daniel A. Mohabir, Walworth, NY (US); John F. Seward, Dansville, NY (US)

(73) Assignee: Xerox Corporation, Norwalk, CT (US)

( * ) Notice: Subject to any disclaimer, the term of this patent is extended or adjusted under 35 U.S.C. 154(b) by 1144 days.

(21) Appl. No.: 12/481,349

(22) Filed: Jun. 9, 2009

(65) Prior Publication Data

US 2010/0309528 A1   Dec. 9, 2010

(51) Int. Cl.
*H04N 1/40* (2006.01)

(52) U.S. Cl.
USPC ........... 358/444; 358/449; 358/474; 358/498; 399/45; 399/370

(58) Field of Classification Search
USPC ............. 358/444, 449, 474, 498; 399/45, 370
See application file for complete search history.

(56) References Cited

U.S. PATENT DOCUMENTS

| | | | |
|---|---|---|---|
| 4,743,974 A | 5/1988 | Lockwood | |
| 5,513,017 A * | 4/1996 | Knodt et al. | 358/471 |
| 5,513,282 A * | 4/1996 | Williams | 382/303 |
| 5,946,527 A | 8/1999 | Salgado et al. | |
| 6,239,880 B1 | 5/2001 | Barrett et al. | |
| 7,511,864 B2 | 3/2009 | Muzzin et al. | |
| 7,570,394 B2 | 8/2009 | Li et al. | |
| 2004/0114147 A1* | 6/2004 | Yeoh et al. | 356/450 |
| 2006/0083565 A1* | 4/2006 | Morimoto | 399/370 |
| 2006/0109520 A1* | 5/2006 | Gossaye et al. | 358/449 |
| 2008/0018671 A1* | 1/2008 | Miake et al. | 345/661 |
| 2008/0049269 A1* | 2/2008 | Chen | 358/474 |
| 2008/0085135 A1* | 4/2008 | Rieck | 399/204 |
| 2009/0116081 A1* | 5/2009 | Kasai | 358/498 |
| 2009/0122360 A1* | 5/2009 | Tanaka et al. | 358/474 |
| 2009/0310991 A1* | 12/2009 | Isogai | 399/45 |

* cited by examiner

*Primary Examiner* — Allen H Nguyen
(74) *Attorney, Agent, or Firm* — Pillsbury Winthrop Shaw Pittman, LLP (57) ABSTRACT

A scanner enables full productivity and individual image size detection, without user intervention for mixed size originals in both simplex and duplex scanning modes. The scanner provides high-productivity single pass scanning while preserving the image size for each of the document scanned. In addition, the scanner may support duplex scanning by adding a second image sensor, for example, in the document handler. Methods of scanning are also provided.

24 Claims, 8 Drawing Sheets

HIGH PRODUCTIVITY SINGLE PASS SCANNING SYSTEM

FIELD

This application generally relates to scanners and scanning documents, including both simplex and duplex scanning modes.

BACKGROUND

In conventional constant velocity transport (CVT) simplex and duplex scanning systems, users typically must choose between either productivity or individual image size detection, for mixed size documents. An example of such a system is disclosed in U.S. Pat. No. 5,946,527, herein incorporated by reference in its entirety. The choice between these scanning modes is not always transparent to the user.

For example, if a user selects full productivity then the system will use the largest paper size detected, via sensors in the document handler, for all document scanned in the stack. If the sensors detects that the largest paper size is letter sized (i.e., 8½×11 inches), all documents will be scanned to electronic image data generally corresponding to that image size, even though some of the documents may actually be smaller.: This may be an inefficiency use of memory resources for mixed sized documents. For instance, a 5×7 inch document also scanned would not require the same number of pixels as a letter sized document. Thus, many pixels would simply be simply be nil (or perhaps, treated as white).

On the other hand, if the user selects individual image size detection then the system must scan each image twice. The first pass detects the size of all sheets in a first low-resolution scan and the second pass scans each sheet in a second high-resolution scan based on the size information determined during the first scan. Both modes reduce scanning efficiency.

Also, in conventional single pass duplex scanning systems it is necessary to have multiple channels of electronics all the way through the system into main scanner image memory. This burdens the system with the additional costs for multiple paths of electronics and multiple interfaces (such as cables). Further; this makes it difficult to add a duplex feature to a base simplex model without a major change in electronics or burdening the base model with added expenses.

SUMMARY

According to one embodiment of this disclosure, a scanner configured to scan mixed documents comprises: a first image sensor configured to scan a first image of a first side of a sheet of media to generate first image data; a first local memory device associated with the first image sensor that is configured to temporarily store first image data substantially as it is being scanned by the first image sensor; a first processor configured to analyze the image data stored in the first local memory device and to determine the size of the first image in at least a slow scan direction; and a main memory device associated with the scanner that is configured to receive first image data transmitted from the first local memory device and store the first image data, wherein the first processor is configured to transmit the first image data to the main memory device once the size of the first image is determined.

According to another embodiment of this disclosure, a method of scanning mixed documents using a scanner comprises: scanning, via a first image sensor, a first image of a first side of a sheet of media to generate first image data; temporarily storing the first image data in a first local memory substantially as it is being scanned; determining, via a first processor, the size of the first image in at least a slow scan direction; transmitting the temporarily stored first image data to a main memory device associated with the scanner once the image size is determined; and storing the first image data in the main memory device.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

According to an aspect of the disclosure, a scanner enables full productivity and individual image size detection, without user intervention for mixed size originals in simplex and/or duplex scanning modes. More preferably, the scanner provides high-productivity single pass scanning while preserving the image size for each of the document scanned.

Figure 1:
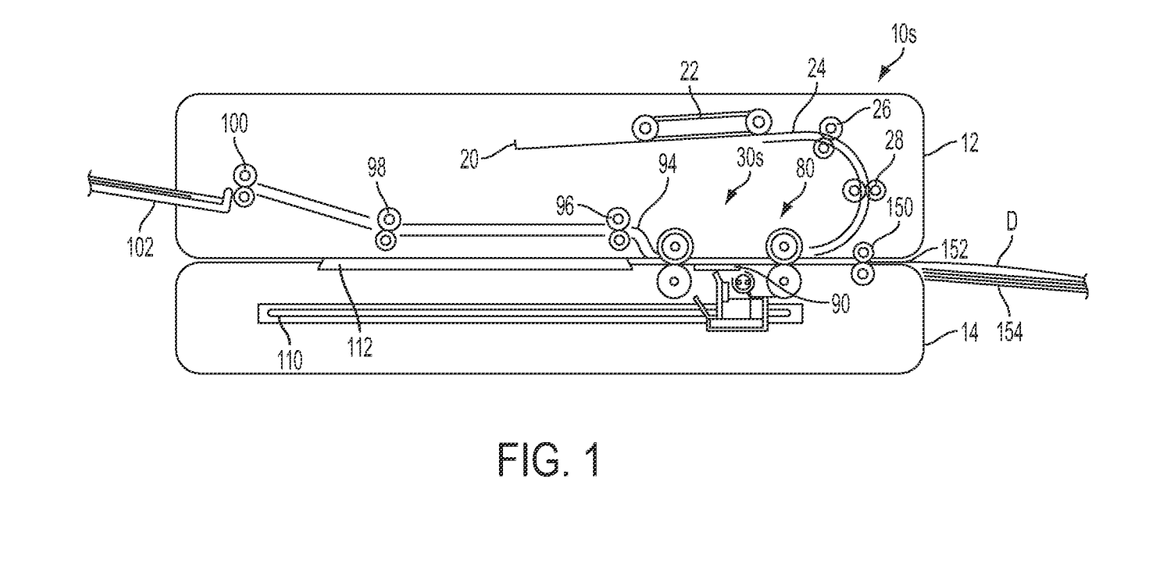
FIG. 1 shows a scanner configured for simplex scanning in accordance with the invention with an embodiment, where

FIG. 1 shows a scanner 10S in accordance with an embodiment. In particular, scanner 10S is configured for simplex scanning (i.e., single-sided scanning of document).

Scanner 10S generally includes upper and lower frame members 12 and 14. Upper and lower frame members 12 and 14 may be rectangular or box-shaped members, connected by a hinge member (not shown) along lower and upper rear edges of frame members 12 and 14, respectively. Upper and lower frame members 12, 14 may include a document handler and a platen, respectively. In one implementation, upper and lower frame members 12 and 14 are separable in a clam-shell fashion at the hinge member to allow access to the area therein-between as will hereinafter be described.

Upper frame member 12 may be provided with a document input tray 20 for holding a stack of documents D such as mixed size originals, having at least two different sizes. The documents D may be placed face-up in the document tray from which data acquisition is desired.

Document input tray 20 is provided with a document feeder 22 for feeding documents D out from document input tray 20.

In one implementation, document feeder 22 may be a well-known top feeding vacuum corrugated feeder found in standard document feeders for light-lens type copiers for feeding documents in a 1-N order. Document input tray 20 may also be upwardly biased or provided with a tray elevator (not shown) to provide documents D in position for feeding.

Documents D are guided by document feeder 22 to an input sheet path 24 to be directed to a scanning position. Along sheet path 24, documents D are driven along by nip roll 26, comprising a pair of rubber rollers which drive the documents in a forward direction along the sheet path 24. A second nip roll 28 may advantageously comprise a cross roll deskewing nip to provide documents in a desired registered position before entering the scanning station. A drive motor (not shown) may be provided for driving the document feeder, and drive rollers in the nips, as well as the other driving elements of raster input scanner 10. Documents 10 are driven along input sheet path 24 into simplex scanning station 30S.

Figure 1A:
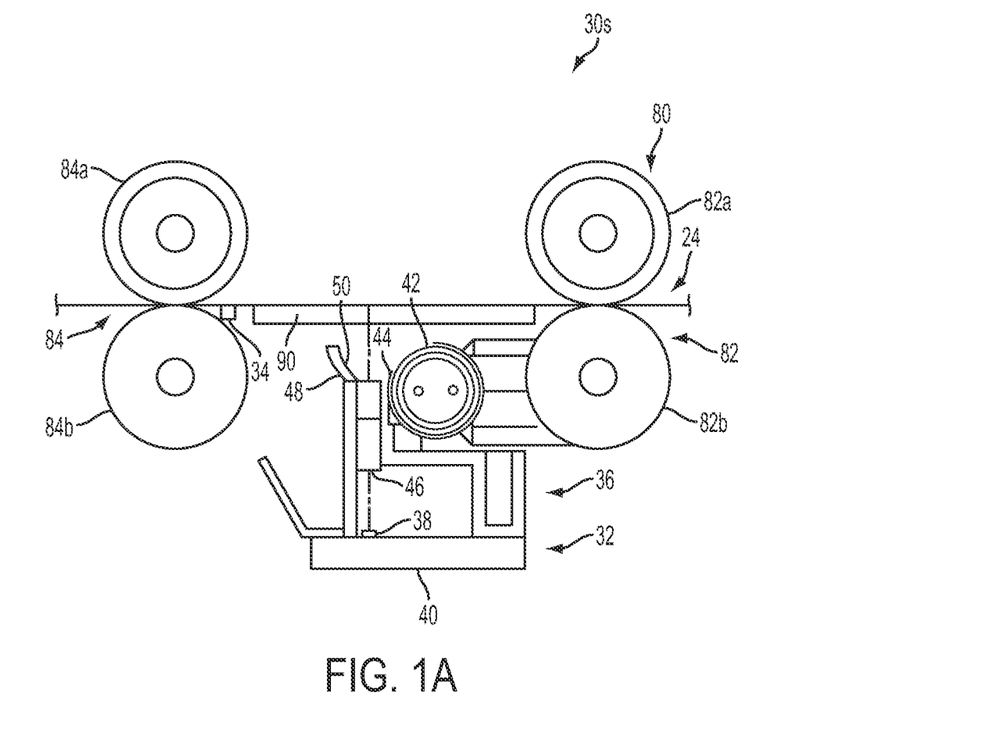
FIG. 1A shows a simplex scanning station in more detail.

As more clearly shown in FIG. 1A, the scanning station 30S may include an image scanning element 32. It will be appreciated that while the figure shows the scanning element 32 located in the platen below the sheet path 24, that in other embodiments the scanning element 32 might be located above the sheet path 24, for example, in the document handler. The scanning element 32 may be fixed in position with respect to sheet path 24, and comprises a scanning element frame generally indicated as 36, which extends transversely across and below the path of document travel, for the support of the scanning array for scanning a document. On a lower portion of frame 36, image scanning array sensor 38 is supported on scanning array support member 40, transverse to the path of sheet travel thereby for scanning documents. Scanning array support member 40 may be a relatively rigid member fixed to the frame 36, for example, by fasteners or adhesives, and supporting scanning array 38 in position across the path of document travel, without sagging or twisting which could cause imaging imperfections.

Image scanning array sensor 38 may be a linear array of photosensitive sensors, which span the width of the scanning platen, such as charge couple devices (CCDs), photodiodes, or other photosensors, which are configured to sense light reflected from a document during an integration period. The photosensitive sensors develop a charge indicative of the amount of light detected, for transmission to an image processor for use in assimilating an electronically stored representation of the image on the document. For example, the scanning array 38 may include a full width array (FWA) imaging sensor, for example, a Toshiba Model No. TCD2713 CCD sensor, Sony Model No. ILX146K CCD sensor, Xerox Model No. XL9C6 CMOS contact sensor, or Toshiba Model No. CIPS317CF620 CCD contact sensor.

Documents directed past scanning element 32 are illuminated by a lamp assembly supported on frame 36 and comprising lamp 42, and lamp cover 44 for directing light towards the document to be scanned. Light from the illuminated document is reflected to lens 46. In one implementation, lens 46 may comprise an image transmitting fiber lenses, such as, for example, produced under the tradename of SELFOC by Nippon Sheet Glass Company Limited, to direct light reflected from the document to scanning array 38. Adjacent to the portion of lens 46 closest to the document is a frame extension member 48, extending generally towards the document which may be advantageously provided with a light reflecting concave surface 50 to further aid in directing light from lamp 42 to illuminate the document. It will of course be appreciated that other optical and illuminating systems may be similarly used to illuminate and direct light from the document to the scanning array 38.

Documents D entering the scanning station 30S may be driven into and through the station by a four roll Controlled Velocity Transport (CVT) arrangement 80 comprising two sets of nip roll pairs 82 and 84 located at the entry and exit to the scanning station, respectively. Each nip roll pair is comprised of an upper drive roll 82a and 84a and a lower idler roll 82b and 84b. Drive rolls 82a and 84a are driven by a motor (not shown) which maintains the speed of the rolls and accordingly, the speed of documents moved by the rolls at a controlled constant velocity. Speed variations should generally be avoided to maintain optimum image quality. The sensors forming the scanning array 38 may be extremely small, and minor movement variations will alter detection of the image. The rollers comprising the CVT may be supported separately from the scanning stations at respective positions on the upper and lower frame portions.

A media sensor 34 may be located near the junction of drive rolls 84a and 84b to detect the presence of a sheet of media, and in particular, the leading and trailing edges thereof. Other positions for media sensor 34 are also possible. The media sensor 34 may be a transmission or reflectance sensor that is configured to detect the presence of a sheet of media.

Documents transported through scanning station 32 are directed between glass platen 90 supported on lower frame member 14 which serves to maintain flatness in documents advancing therethrough for scanning. The glass platen 90 may be approximately 4 mm thick, for support of the document as it passes through the scanning station. In another embodiment, the document may be biased against a single glass platen glass member by a baffle, thereby achieving the required flatness while the document passes through the scanning station.

Referring again to FIG. 1, as documents are advanced through scanning station 30S, photosensitive sensors on scanning array 38 are repeatedly exposed to light reflected from the document to derive an electronic representation of the image thereon for transmission to an image processing or storage device. Upon leaving the scanning station 32, documents are driven by the CVT arrangement 80 to an exit sheet path 94 where documents are driven by nip roll pairs 96, 98 and 100 into an output tray 102. The passage of documents along the described sheet path, having a generally U-shape, with a single fold, and feeding the documents in the input tray 20 from the top of the input stack, provides a single natural inversion of the documents, so that they are arranged face down in output tray 102 in the same order that they were originally provided. In one implementation, output tray may be a simple low energy uphill stacking tray without requiring mechanical document handling therein.

Scanning element 32 may be supported for reciprocating scanning movement, on support rails 110. Support rails 110 are provided in lower frame portion 14, parallel to the direction of document travel of sheet travel through scanning station 30S, and located, generally on either side of the path of sheet travel. While only a single support rail 110 is shown in FIG. 1, it will be appreciated that at least two of such elements may be provided. Scanning element 32 may also be provided with bearings or bushings to reduce sliding friction between scanning element 32 and the rails 110. Rails 110 support the scanning element 32 for movement across the length of lower frame portion 14 slightly below a scanning platen 112. Scanning platen 112 may a generally rectangular member having a size allowing the placement of documents thereon for scanning by the scanning element 32 as it moves across the length of the lower frame 14.

Scanning element 32 may be driven in its movement by any suitable drive arrangement (not shown) providing a very smooth, non-vibrating motion across the lower frame, such as for example a pulley and cable system or a lead screw drive system. Various vibration damping arrangements may be provided to damp undesirable motion, such as bearings, bushings and/or cushions. As the scanning element 32 is moved across the platen 112, the sensor array 38 is repeatedly exposed to incremental slices of the document, producing charge information indicative of the image on the document for use in assimilating an electronically stored image of the document.

A semi-automatic document feeding mode (SADH), useful for feeding single documents or computer-folded documents through the raster input scanner 10S may be provided. An entrance nip roll pair 150 is provided adjacent a document feeding entrance or input 152 between upper and lower frames 12 and 14 of raster input scanner 10 and arranged to direct documents into the sheet path 24 to CVT 80 for feeding document through scanning station 30 as previously described. A tray 154 may be provided to support computer fan-folded documents (normally simplex documents) for feeding oriented to provide image information face-up to allow scanning by fixed scanning element 30. Documents entering the SADH input 152 will be directed to exit sheet path 94 to output tray 102.

Control of the described arrangement may be accomplished in a variety of ways, depending on the usage of the device. Feeding of documents, control of sheets directed through the sheet path operation during the desired modes of operation, including movement of the scanning element 32 in its scanning motion across the platen may be controlled by an on-board controller and processor unit provided in a main scanner electronics module.

In particular, control of the imaging assembly may be via an imaging electronics module which includes a processor device and associated electronics, which repeatedly polls the sensors of sensor array 38 to generate video data corresponding, to scanned image data.

The control of the device may be responsive to operator information input, for example, via a graphical user interface of the scanner. Alternatively, the scanner may be partially or completely controlled by another device, such as for example, a computer, a local or remote workstation or compatible printer.

Figure 2:
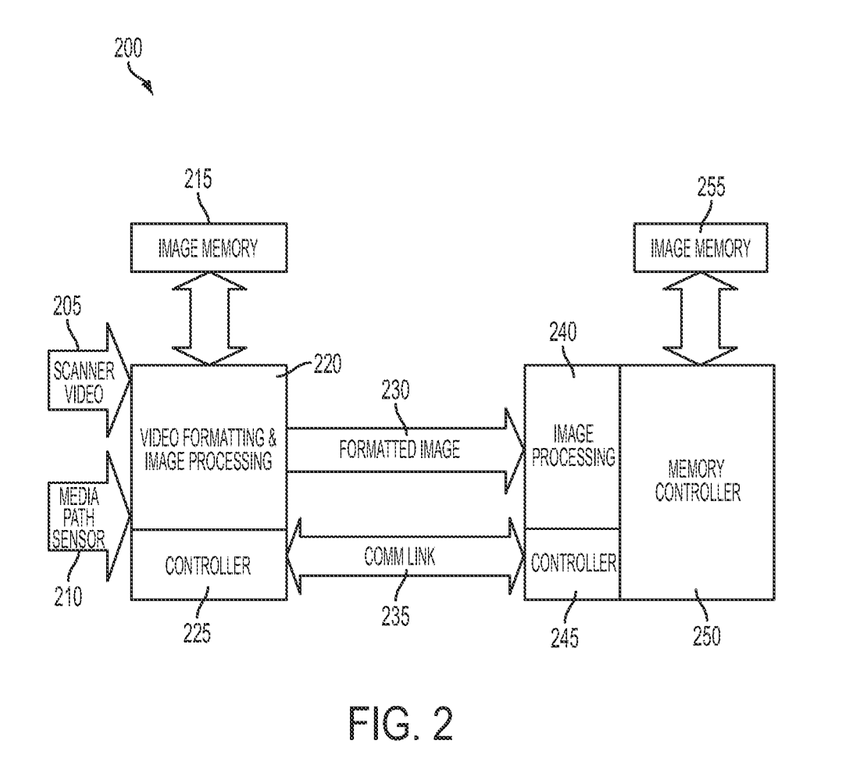
FIG. 2 shows an exemplary dataflow architecture for handling a simplex scanner video steam in accordance with an embodiment.

FIG. 2 shows an exemplary dataflow architecture 200 for handling a simplex scanner video steam in accordance with an embodiment.

An image may be initiated when the media sensor 34 detects the leading edge of a sheet of media passing through the scanning station 30S and generates a signal 210 in response to the detect sheet. The signal 210 may indicate that a sheet is in front of the media path sensor 34. In response to the signal 210, the scanning controller 225 requests video formatting and processing unit 220 to begin to receive the input video stream from the sensor array 38 of the scanned image.

The scanner video data 205 is formed from fast and slow scan video data received from the sensor array 38. The fast scan direction may be limited by the sensor array 38 and is understood to be a maximum scannable width. For example, this may be 12 inches (i.e., the width of a typical sensor array). If an image has a dimension over this width, it would have to be scanned in the slow scan direction (along the process direction).

Scanner video 205, as it is received, may be formatted by the video processor unit 220 (although this need not be the case) and the image is stored in local image memory 215 in real-time. Video formatting allows rasterizing of video from various styles of image sensors. For example, video processing may include controlling one or more of the following: pixel gain, pixel offset, global gain, global offset, color space transform, or image cropping. Depending upon the image sensor 38 orientation, a 180 degree rotation (or mirror function) could be applied so that the transmitted image requires no further formatting. It may be possible for the system to interrogate the system to determine the paper size and/or orientation to in order to handle output orientations. In addition, the video formatting may include centering, annotating pages, merging images, and resizing to fit on a different media. It may be also possible for the system to interrogate the system to determine the paper size and/or orientation to in order to handle output orientations. Other processing may be performed also. These processes may also be performed downstream in the main scanner formatting unit.

The scanned image data, provided from the image sensor, may be comprised of a series of scanlines, with each scanline comprising a number of pixels depending on the resolution of the image sensor 38 (e.g., 300 dpi, 600 dpi, or 1200 dpi).

An image sensor 38, for example, that is 12 inches in length at a resolutions of 600 dots per inch (dpi), may generate video data that has 7200 pixels per scanline. Overscanning may also be utilized. For instance, a 12.4 inch long image sensor at 600 dpi corresponding to 7440 pixels per scanline might be used. The video processor unit 220 may crop the overscanned scanlines as received to say 7200 pixels. The scanlines corresponding to the scanned document are temporarily stored in local memory 215.

In some implementations, the user may select the image resolution of the document(s) to be scanned—up to the maximum resolution of the image sensor—via a graphical user interface. For lower resolutions, printing may be much faster than at higher resolutions. Thus, resolution may be a trade-off with process time.

In one embodiment, video formatting and processor unit 220 may determine the size of the image in the slow scan direction based on the series of scanlines temporarily stored in local memory 215. For example, the number of scanlines between the leading and trailing edges of the image may be determined. Many of the commonly used print media have the substantially the same width, but vary in the length directions. This may be true, for instance, for letter, legal and A4 sized documents. The fast scan (or cross-process) image size is simply set by the width of the image scanner 38.

For example, when the leading edge of the sheet is detected, a scanline counter is set to zero. Upon receiving the next frame of video data, the scanline counter is increased by one. Next, a determination is made as to whether the trailing edge of the sheet is detected. If not, the process may continue (as necessary) until the trailing edge of the sheet is detected. As such, the scanline counter includes the number of scanlines between the leading and trailing edges of the sheet. This information may be output to the main scanner electronics module. The length of the scanned image may be calculated or deduced from the number of scalines which had been recorded, and the resolution of the image sensor. The counter may be implemented by a register or other circuitry.

In another implementation, the image size may be determined in both the slow scan (or process) and the fast scan (cross-process) directions. This may be advantageous for mixed document, which vary substantially in size not only in the length direction, but alternatively or additional, in the width direction.

The image processor 220 may be configured to discern edges of the sheet being scanned to determine the size of the image. One exemplary method for determining the size of the original image is disclosed in U.S. Patent Application Publication No. 2004/0190072, herein incorporated by reference in its entirety. Each of the width and length of the scanned document may be similarly determined.

The number of pixels of each formatted scanned image substantially corresponds to the image size of each scanned document. In order to preserve the image size of the scanned document, the number of pixels may be a function of the resolution and the detected image size.

As one example, a document scanned is 8½×11 inch at a resolution of 600 dpi. The video formatting and processing unit 220, may determine the size of the image to be approximately 5100×6600 pixels. By contrast, for a 5×7 inch document scanned at 600 dpi, the video formatting and processing unit 220 may determine the image size to be about 3000×4200 pixels. This may result in a significant savings of memory requirements for differently sized documents, especially in an export or scan-to-file mode.

Image processing and/or storage in local memory 215 continue until the trailing edge of the document is detected by the media path sensor 34. The scanned image data may be transmitted from local memory 215 through the video formatting and processing unit 220 to the memory controller 250, once the image size is determined. Then while the image data 230 of the just scanned document is being transferred downstream, the next document image may be written into local memory 215. Each of the images of a print job may be subsequently stored in main image memory 255.

The image data 230 might be formatted as Red-Green-Blue (RBG) or mono image data (although other image formats might also be used). For instance, image data may be binary (single bit) or multi-bit (contone) data, as known in the art. The image data may be converted and/or stored in any various electronic formats, including compressed image formats. Suitable image data formats may include, for example, TIFF, JPEG, GIF, BMP, PDF, etc.

Local memory 215 and main memory 255 may include, for example, any electronic memory device (e.g., DDR, flash memory, EEPROM, etc.) or other memory device (e.g., disk drive, writable optical disk, etc.) for storing electronic data.

In some implementations, the system may also be configured to identify standard media sizes which correspond to the scanned image, such, for example, letter (8½×11 inches), legal (8½×14 inches), ledger (11×17 inches), A4 (8.3×11.7 inches). In addition, the system may be configured to identify various other standard paper sizes according to one or more paper size standards, such as, ISO 216, ISO 217, ISO 269, etc. Standard photograph sizes (e.g., 3×5, 5×7, 8×10 inches, etc.) may also be considered.

A look-up table (LUT) may be provided, in memory, to associate determined image sizes with standard sizes. An entry within the LUT may be found that best correlates to a scanned image sizes within a predetermined tolerance, for example, within ¼ inches in the width and length dimensions.

Video formatting and image processor unit 220 may also configured to determine the orientation of an image based on standard paper sizes and the slow scan dimension, if so desired. For example, the system may be programmed to rotate images based on the mechanical configuration of the scan bars, relative to the input paper path.

Once the image size for a scanned image is determined, the local memory controller 225 sends an interrupt signal to the main controller 245 to indicate that the image size of the sheet is available and transmits the image size via data link 235 to the main image processing unit 240.

In some implementations, the local memory 215, video formatting and image processing unit 220, local memory controller 225 may comprise an imaging electronic module. Similarly, image processing unit 240, main controller 245, memory controller 250 and main image memory 255 may comprise a main scanner electronics module.

The various electronics modules may include one or more printed circuit boards (PCB), integrated circuits, microprocessors, input/output (I/O) interfaces, associated powered supplies, and other electronics.

The imaging electronics module may be coupled to the main electronics module by an interface. For example, the interface may include one or more connections for transmitted image data 230 and other command information via a data link 235. Alternatively, a single channel configured to transmit both image data and image size data may be provided. The image size may be transmitted before its corresponding image data, so that the image size may be used for subsequent image processing as the image data is being received by the main image processing unit 220. The connection may be a cable.

The Image size for images of a print job may be stored in the main scanner memory 255 along with each image. Specifically, image size information may be stored as a combination of width and length values and perhaps their units (e.g., width; length; units). Metric and/or English units of measurements may be used for width and length values. Alternatively or additionally, the image size may be stored as metadata and/or electronic tags corresponding to standard sheet sizes (e.g., legal, letter, A4, etc).

Controller 245 may control downstream functions with the image size in main image memory 255. Various downstream functions may be programmed and/or subsequently controlled using the image size, such as, for example, image processing, rendering, compression and/or printing.

Knowing the image size a priori may be used in some implementations to select an appropriate sized sheet of media from a media tray, if available, for the image to subsequently be printed upon. For example, if one scanned image is legal-sized then it may be printed on legal size paper. If another scanned image is letter-sized then it may be printed on letter sized paper. Accordingly, the image size and its substrate may be matched.

An interrupt signal may be triggered by local image controller 225 to indicate to the system that the next image available may be scanned. Thus, while the current image is being transmitted from local memory 215 to image processing unit 240, the next image may be input from the scanner array 38. The local memory controller 225 may store the next image in an unused section of memory 215. As such, the minimum size for local memory 215 should be at least twice (2×) the maximum image size to be scanned.

All print jobs may be treated in the same manner, such that the user is not required to program the mode for mixed size originals. Instead, the scan image for each document is retained according to its actual size. Thus, there is no loss of productivity, as each image—regardless of its size—may maintain its unique size. By contrast, as discussed above, in conventional scanners either the largest paper size detected via sensors in the document handler for all images sheets in the stack, or a two-scan operation is performed.

Figure 3:
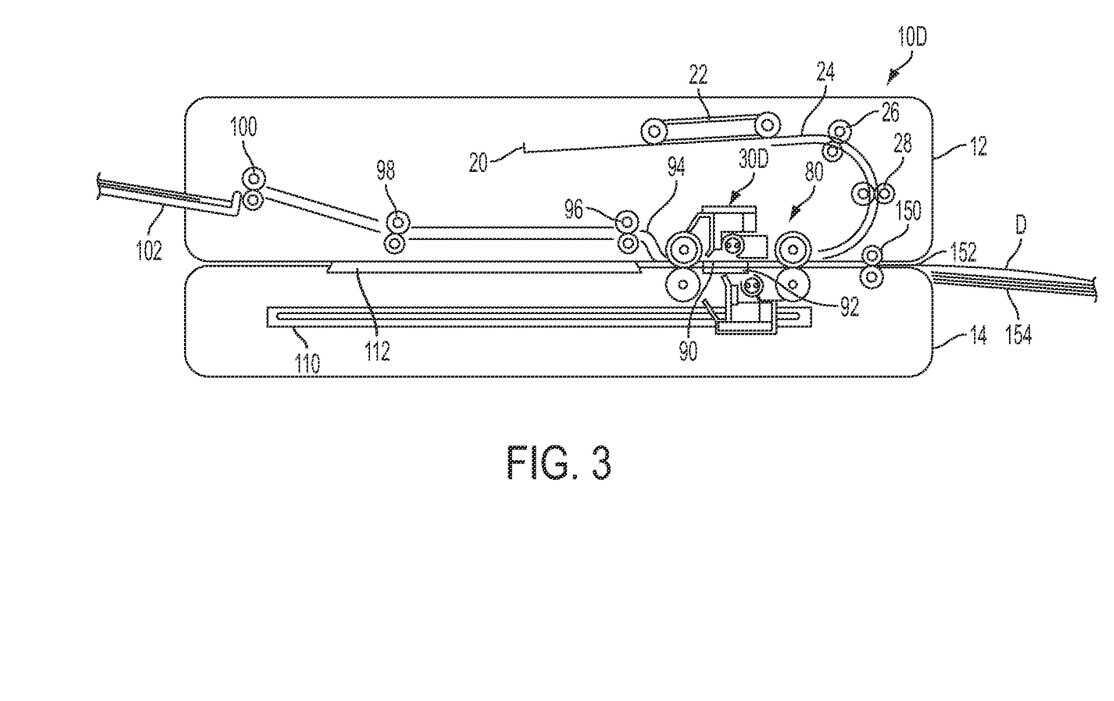
FIG. 3 shows a scanner configured for duplex printing in accordance with an embodiment, where

FIG. 3 shows a scanner 10D in accordance with an embodiment. In particular, scanner 10D is configured for duplex (i.e., dual-sided scanning of document). Although it will be appreciated that scanner 10D may also function in a simplex mode, for the scanning either top or bottom surfaces of documents, as desired.

Documents 10 are driven along input sheet path 24 into duplex scanning station 30D (similar to the simplex embodiment discussed above). As more clearly shown in FIG. 3A, duplex scanning station 30D includes upper and lower scanning elements 32a, 32b, with upper scanning elements provided as essentially a mirror image of lower scanning element 32. While the figures show upper scanning element 32a located forward of lower scanning element 32b, it will be appreciated that they may be positioned directly above/below each other, and/or the lower scanning element 32b could be located forward of the upper scanning element 32a. Alike reference numerals have been designated with "a" corresponding to elements of the upper scanning element 32a and "b" corresponding to elements of lower scanning element 32b.

Figure 3A:
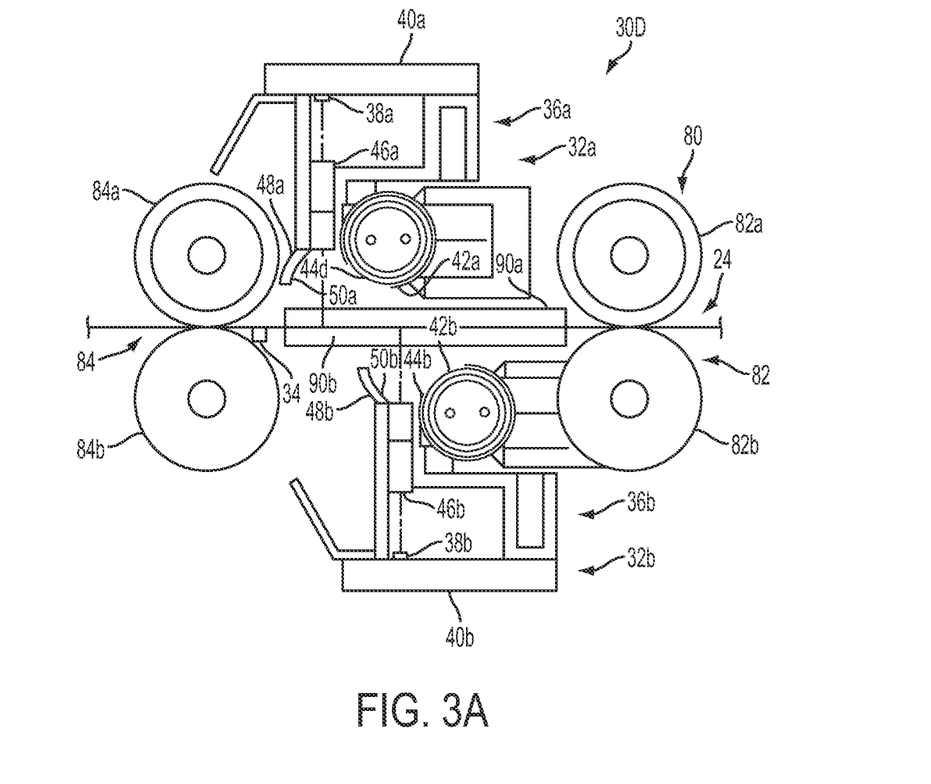
FIG. 3A shows a duplex scanning station in more detail.

Documents that are directed past scanning elements 32a, 32b are illuminated by a lamp assembly supported on frames 36a, 36b and comprise lamps 42a, 42b, and lamp covers 44a, 44b for directing light towards the document to be scanned. Light from the illuminated document is reflected to lenses 46a, 46b provided to direct light reflected from the document to scanning arrays 38a, 38b. Adjacent to the portion of lenses 46a, 46b closest to the document is a frame extension members 48a, 48b, extending generally towards the document which may be advantageously provided with a light reflecting concave surfaces 50a, 50b to further aid in directing light from lamps 42a, 42b to illuminate the document. It will of course be appreciated that other optical and illuminating systems may be used to illuminate and direct light from the document to the scanning arrays 38a, 38b.

Document sheets transported through the duplex scanning station 30D are directed between platen glass members 90a and 90b supported respectively on upper and lower frame members 12 and 14 which serve to maintain flatness in documents advancing therethrough for scanning. The platen glass members 90a and 90b may be, for example, each 4 mm thick, for support of the document as it passes through the scanning station. In one implementation, the platen glass members 90a and 90b may be supported with a spacing of about 0.6 mm between them. The glass thickness and gap are chosen to be as small as possible because the depth of field of the SELFOC lens is very small.

For duplex documents, image information from each side of the document is derived and transmitted independently by each of respective scanning sensor array 38a, 38b. Thus, for example, while array 38a is deriving image information, array 38b may be transferring previously derived image information out of the array (or vice versa).

Media sensors 34a, 34b may be located near the junction of drive rolls 84a and 84b to detect the presence of a sheet of media, and in particular, the leading and trailing edges thereof. In some implementations, only a single media sensor 34 may be all that may be necessary to detect the sheet. Other positions for media sensors 34a, 34b are also possible. The media sensors 34a, 34b may be transmission or reflectance sensors that are configured to detect that a sheet of media is in the presence of the media sensor 34.

Control of the described arrangement may be accomplished in a variety of ways, depending on the usage of the device. Feeding of documents, control of sheets directed through the sheet path operation during the desired modes of operation, including movement of the scanning element 32 in its scanning motion across the platen may be controlled by an on-board controller and processor unit provided in a main scanner electronics module.

Control of the imaging assembly may also be via a pair of imaging electronics modules which each include a processor device and associated electronics which repeatedly polls the sensors of sensor arrays 38a, 38b to generate video data corresponding to scanned image data.

Figure 4:
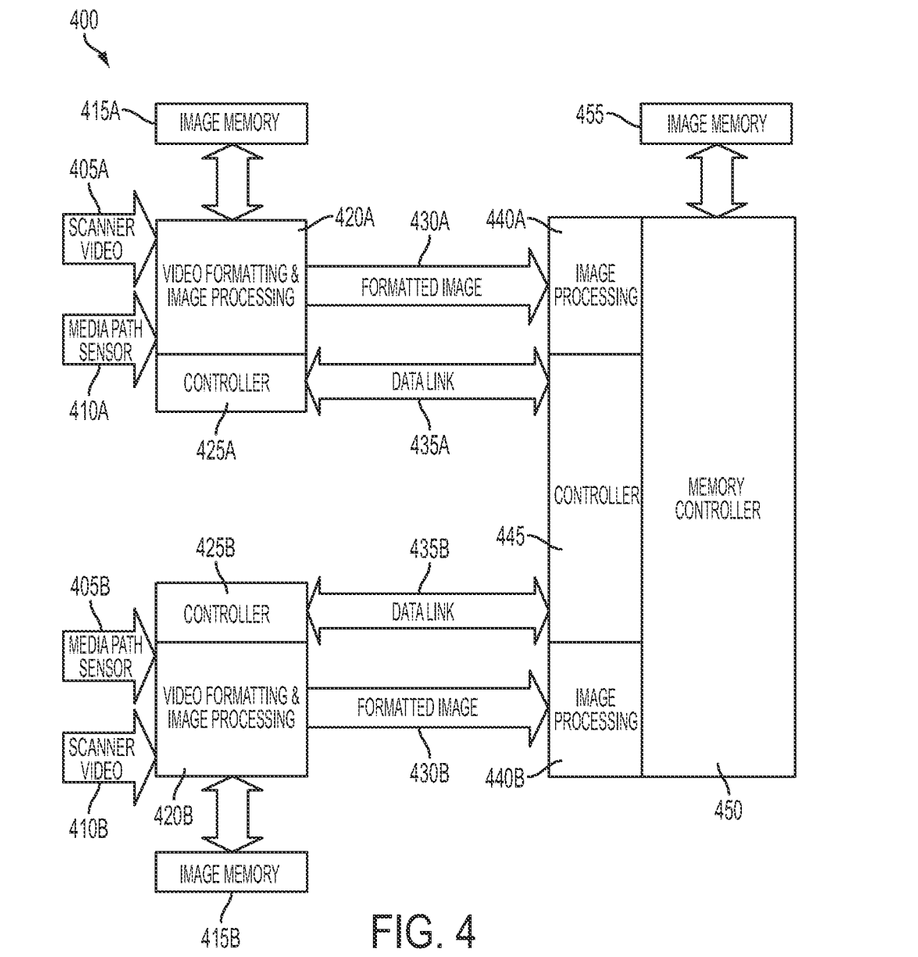
FIG. 4 shows an exemplary dataflow architecture for a duplex scanning system, wherein scanned images for both sides of a duplex image are transmitted to the main scanner electronics module, each via a different interface channel, in accordance with an embodiment.

FIG. 4 shows an exemplary dataflow architecture 400 for a duplex scanning system, wherein scanned images for both sides of a duplex image are transmitted to the main scanner electronics module, each by a different channel, in accordance with an embodiment.

This configuration enables full productivity and individual image size detection without user intervention for mixed size originals in a duplex scanning system. In this system, both sides of the image can be simultaneously scanned and processed by the separate image paths.

Duplex images may be initiated when one or both of media sensors 34a, 34b detects the leading edge of a sheet of media passing through the scanning station 30D and generates signals 410A, 410B in response to the detect sheet. The signals 410A, 410B may indicate that a sheet is in front of at least one, if not both, of media path sensors 34a, 34b.

In response to the signals 410A, the scanning controller 425A requests video processor 420A to begin to receive the input video stream from the sensor array 38a corresponding to a first side of a scanned document. Similarly, in response to the signals 410B, the scanning controller 425B requests video processor 420B to begin to receive the input video stream from the sensor array 38b correspond to a second side of the scanned document.

The scanner video data 405A, 405B is formed from fast and/or slow scan video data received from the sensor arrays 38a, 38b, respectively.

Scanner video 405A, 405B of side 1 (Video A) and side 2 (Video B) of the scanned document can be input to the system in any order, or simultaneously, or overlapping depending on side 1 and side 2 image sensors 38a, 38b position in the scanner. Because each image path has its own separate electronics module independent local memory, processing unit and controller, there is no dependence on the input video sequence.

For each scanner image path (A and B), the scanner video 405A, 405B as it is received, may be formatted, and/or processed by video formatting and processing units 420A, 420B and the image is stored in local memory 415A, 415B (Image memory A and B) in substantially real-time. Video formatting allows rasterizing of video from various styles of image sensors. For example, video processing may include controlling one or more of the following: pixel gain, pixel offset, global gain, global offset, color space transform, or image cropping. Depending upon the image sensor array 38 orientation, a 180 degree rotation (or mirror function) could be applied so that the transmitted image requires no further formatting. In addition, the video formatting may include centering, annotating pages, merging images, and resizing to fit on a different media. It may be possible for the system to interrogate the system to determine the paper size and/or orientation to in order to handle output orientations. Other processing may be performed also. These processes might also be performed downstream in the main scanner formatting unit.

The formatted video data 430A, 430B is transmitted from local memories 415A, 415B through the video formatting and processing units 420A, 420B to the memory controllers 450A, 450B located in a main electronic module of the scanner. Each of the images of a print job may be stored in the main image memory 455. The video data 430A, 430B might be formatted Red-Green-Blue (RBG) or mono image data (although other image formats might also be used).

Local Memories 415A, 415B and main memories 455 may include, for example, any electronic memory (e.g., DDR, flash memory, EEPROM, etc.) or other memory device (e.g., disk drive, writable optical disk, etc.) for storing electronic data. Image processing and/or storage in local memory 415A, 415B continue until the trailing edge of the document is detected by the media path sensors 34a, 34b.

While the image data 430A, 430B of the just scanned document is being transferred downstream, the next document image may be written into local memories 415A, 415B. Other information may be communicated via data links 435A, 435B, as well.

Image processors 420A, 420B are configured to determine the size of the image based on the fast and/or slow scan data of the sensor arrays 38a, 38b, similar to the other embodiment discussed above.

Once the image size for a scanned image is determined, the local controllers 425A, 425B send an interrupt signal to main controller 445 to indicate that the image size of the sheet is available and transmits the image size via data links 435A, 435B. In one implementation, data links 435A, 435B may be a cable connection such, as a serial communication link.

Image size for images of a print job may be stored in main memory 455 along with each image. Specifically, image size information may be stored as a combination of width and length values and perhaps their units (e.g., width; length; units). Metric and/or English units of measurements may be used for width and length values. Alternatively or additionally, image size may be stored as metadata data and/or electronic tags corresponding to standard sheet sizes (e.g., legal, letter, A4, etc).

Knowing the image size a priori may be used in some implementation to select an appropriate sized sheet of print media from a media tray, if available, for the image to subsequently be printed upon. For example, if one scanned image is legal-sized then it may be printed on legal size paper. If another scanned image is letter-sized then it may be printed on letter sized paper.

Main controller 445 may be configured to control all downstream functions with the image size in main image memory 455. The downstream functions may include various processes, such as image processing, rendering, compression and/or printing.

An additional interrupt signal may be triggered by controllers 425A, 425B to indicate to the system that the next image available may be scanned. Thus, while the current image is being transmitted from local memories 415A, 415B to image processors 440A, 440B, the next image may be input from the scanner array 38a, 38b. The memory controllers 425A, 425B may store the next image in an unused section of local memories 415A, 415B. As such, the minimum size for each of local memories 415A, 415B should be at least twice (2×) the maximum image size to be scanned.

Even though both sides of the image will be the same size, it may be necessary for each channel to communicate independently to the main controller 445 when each image is in local memory 415A, 415B. Each image can be pulled from local memory 415A, 415B independent of the other channels timing. During this image active time, the controllers 424A, 425B perform a data steering function that sends each image to the memory controller and the formatted/processed image is stored in memory and an image size counter is enabled. For instance, when the images from side 1 or side 2 are transmitted downstream, controller 425A may output image A and pass image B though in the correct sequence.

Figure 5:
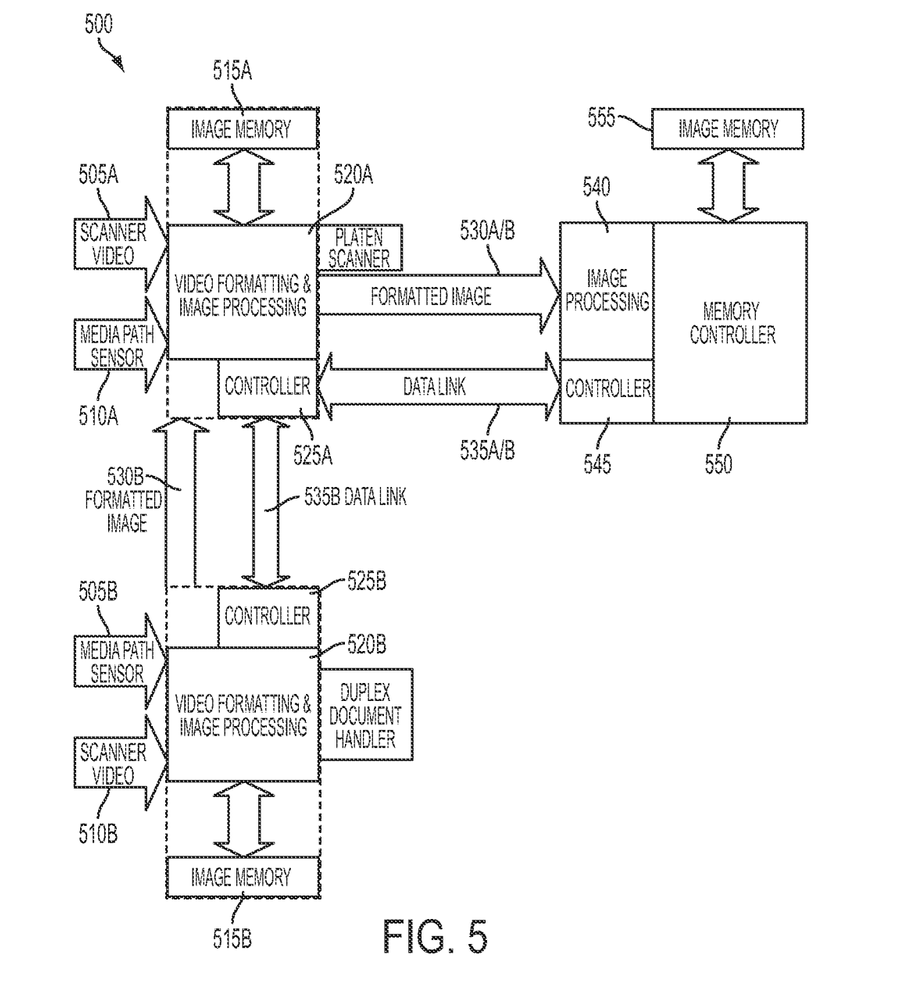
FIG. 5 shows an exemplary dataflow architecture for a duplex scanning system, wherein scanned images for both sides of a duplex image are multiplexed and transmitted via a single interface channel to the main scanner electronics module, in accordance with an embodiment.

FIG. 5 shows an exemplary dataflow architecture 500 for a duplex scanning system, wherein scanned images for both sides of a duplex image are multiplexed and transmitted via a single channel to the main scanner electronics module, in accordance with an embodiment.

As will be appreciated, rather than having two interface channels (as in the embodiment shown in FIG. 4), images of both sides of a duplex image may be transmitted via a single interface channel to the main scanner electronic module.

Duplex images may be initiated when one or both of media sensors 34a, 34b detect the leading edge of a sheet of media passing through the scanning station 30D and generates signals 510A, 510B in response to the detect sheet. The signals 510A, 510B may indicate that a sheet is in front of at least one, if not both, of media path sensors 34a, 34b.

In response to the signals 510A, the scanning controller 525A requests video formatting and processing unit 520A to begin to receive the input video stream from the sensor arrays 38a corresponding to a first side of a scanned document. Similarly, in response to the signals 510B, the scanning controller 525B requests video formatting and processing unit 520B to begin to receive the input video stream from the sensor array 38b correspond to a second side of the scanned document.

The scanner video data 505A, 505B is formed from fast and slow scan video data received from the sensor arrays 38a, 38b, respectively.

Scanner video 505A, 505B of side 1 (Video A) and side 2 (Video B) of the scanned document can be input to the system in any order, or simultaneously, or overlapping depending on side 1 and side 2 image sensors 38a, 38b position in the scanner. Because each image path has a separate electronics module including an independent local memory, processing unit and controller, there is no dependence on the input video sequence.

For each scanner image path (A and B), the scanner video 505A, 505B as it is received, may be formatted, and/or processed by video formatting and processing unit 520A, 520B is applied, and the image is stored in local memory 515A, 515B (Image memory A and B) in substantially real-time. Video formatting allows rasterizing of video from various styles of image sensors. For example, video processing may include controlling one or more of the following: pixel gain, pixel offset, global gain, global offset, color space transform, or image cropping. Depending upon the image sensor array 38 orientation, a 180 degree rotation (or mirror function) could be applied so that the transmitted image requires no further formatting. It may be possible for the system to interrogate the system to determine the paper size and/or orientation to in order to handle output orientations. In addition, the video formatting may include centering, annotating pages, merging images, and resizing to fit on a different media. It may be possible for the system to interrogate the system to determine the paper size and/or orientation to in order to handle output orientations. Other processing may be performed also. These processes may also be performed downstream in the main scanner formatting unit.

In one implementation, the first local controller 525A may perform a data steering function in image path A to steer the output from image path B to the downstream electronic module while it is processing and storing image A into local memory 515A. Of course, the opposite configuration (not shown) may also be used, where controller 525B may perform a data steering function in image path B to steer the output from image path A to the downstream electronics module while it is processing and storing image B into local memory 515B.

Depending on the position of the image sensors 38a, 38b in the scanner, either side may be input first and there might be some degree of overlap. This input sequence will determine how the controller 525A will control the flow of the images to be transmitted. In general, while image A is being stored in local memory 515A, image B may be transmitted to main image processing unit 540, main memory controller 550, and then to the main memory 555. However, if there is overlap and parts or all of both images are simultaneously being stored then it may be necessary to transmit at a higher bandwidth than scanned in order to ensure time in the output stream to fit both output images. If the maximum bandwidth of the transmitted images is not sufficient then it may still be possible to reduce the scanner bandwidth. This may be a limitation of the serial channel configuration and is not related to mixed size original requirements.

Video formatting and processing units 520A, 520B may also be configured to determine the size of the image based on the slow and/or fast scan data of the sensor arrays 38a, 38b, similar to the other embodiments discussed above.

By the use of local memory and intelligent multiplexing, formatted images 530A/B can be transmitted via a single data link 535A/B for any configuration of scan sensors in the document handler. In addition, the images may be formatted, and can be rotated (if needed) so that required downstream functions may be reduced. Because there is only a single connection 535A/B to the scanner, it may be compatible with both simplex and duplex scanning systems alike. Thus, an upgrade from simplex to duplex may only require swapping a document handler that is configured for duplex scanning. This does not burden the base platen scanner with added expense.

Figure 6:
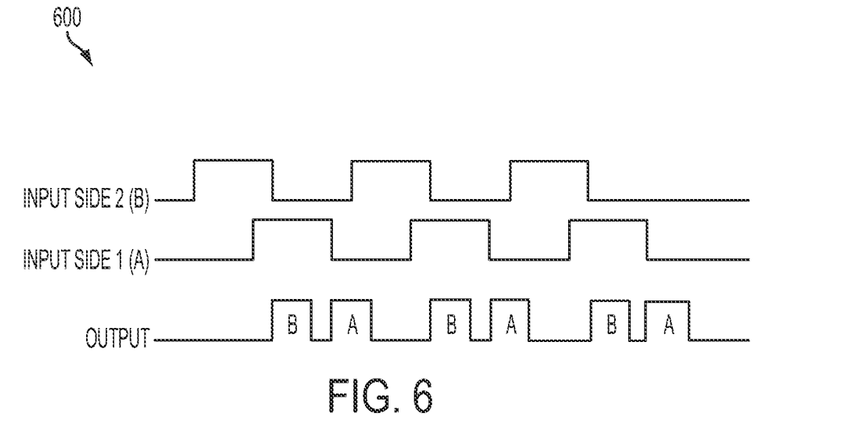
FIG. 6 shows a schematic of receiving scanning video from side 1 (Video A) and side 2 (Video B) of a sheet of media, in accordance with an embodiment.

FIG. 6 shows a schematic of receiving scanning video from side 1 (Video A) and side 2 (Video B) of a sheet of media, in accordance with an embodiment.

Although FIG. 6 shows video B preceding video A, it will be appreciated that the scanning video may be input into a duplex scanning system, in accordance with an embodiment, in any order, simultaneously, or overlapping, depending on side 1 and side 2 image scanning elements 38a, 38b positions in the scanner. Since each image path has a separate electronics module, including, among other things, a local memory, video formatting and processing unit, and controller, scanning and processing of each side may be independently performed.

For each image path, the leading edge of the paper path sensor starts the scanner path video processing while the trailing edge is determined by a programmed size. As side B is being input, it is processed and stored in its local memory. Some time later as side A is input, it is processed and stored in its local memory. When image B is through being scanned in local memory, an interrupt signal may be generated to one image controller, which in turn communicates to the other image controller A that the event has occurred.

It will be appreciated that by storing both images in local memory, for example, as shown in FIG. 4, that such a system may be able to transmit images out of memory at a higher bandwidth than scanned in at. If both images need to be stored then transmission output bandwidth should be sufficient to keep up with the scanner input bandwidth. Both sides may be scanned simultaneously with minimal timing between images. As long as the transmission bandwidth is twice (2×) the input bandwidth the system may function. If the transmission bandwidth is not sufficient then the scanner bandwidth might need to be reduced. For each image path (A and B), the steering function allows video 410A, 410B to be simultaneously input from a scanner and input from the other image path.

In some situations, though, only one side of the sheet may need to be stored while the other side is transmitted though in real-time. For instance, as shown in FIG. 5, when images from side 1 and side 2 are transmitted downstream, local controller 525A may output image A and allow image B to pass through in the correct sequence. As such, only one local memory 515A may be used depending on which side needs to be stored so long as there is sufficient time between scanned images to allow one image though to transmission while the other image is being stored.

Because there is a single video channel to the main scanner electronics module, according to the embodiment shown a FIG. 5, a single interface may be all that is need for either a simplex or duplex system.

Thus, unlike conventional scanning, the downstream system does not have to include a dual channel interface in its base configuration (simplex) to enable a duplex upgrade. The elimination of the second channel may reduce costs and also allows the same main electronics module and platen scanner electronics module to support simplex, or duplex with the addition of an upgraded document handler having an additional image sensor device and electronics module.

In one embodiment, a simplex scanner may be upgraded or converted to a duplex scanner by adding the document handler with an additional (second) image sensor and associated electronics module. The second electronics module may be coupled to the main scanner electronics module, or to a first electronics module which is in turn connected to the main scanner electronic module.

As used herein, "document" refers to an image bearing original from which scanning or copying is desired. Documents may comprise image supporting substrates, such as cut sheets of paper, photographs, transparencies or other individual pieces of thin material, computer forms forming a continuous length of material, or any image bearing substrate from which scanning or copying may be desired. When necessary, the type of document for which the description finds use will be described with greater particularity. "Mixed documents" as used herein refers to plural documents of at least two sizes.

"Image" as used herein refers to the information on the document, for which scanning is desired, and which will be in some manner copied to another substrate or to an electronic storage medium. Images may include, for example, text, images, halftones, etc.

"Scanning" as used herein refers to the operation of acquiring an electronic representation of the image or information about the image.

In some embodiments, the scanner may be a stand alone system or incorporated in another device, such as, for example, a printer, copier, fax machine, or multifunctional device having combined functionality.

While this disclosure has been described in connection with what is presently considered to be the most practical and preferred embodiment, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

What is claimed is:

1. A scanner configured to scan mixed sized documents comprising:
a first image sensor configured to scan a first image of a first side of a sheet of media to generate first scanned image data;
a first local memory device associated with the first image sensor that is configured to temporarily store the first scanned image data as it is being scanned by the first image sensor;
a first processor operatively connected to the first local memory device and configured to analyze the first scanned image data stored in the first local memory device and to determine the size of the first scanned image in both a slow scan direction and a fast scan direction; and
a main memory device associated with the scanner that is configured to receive the first scanned image data transmitted from the first local memory device and store the first scanned image data,
wherein the first processor is configured to transmit the first scanned image data and the determined size to the main memory device once the size of the first scanned image is determined,
wherein the first scanned image data, provided by the first image sensor, comprises a series of scanlines, and
wherein the size of the first scanned image in the slow scan direction is determined based on the series of scanlines temporarily stored in the first local memory device.

2. The scanner according to claim 1, further comprising a data link configured to transmit the first scanned image data from the first local memory device to the main memory device.

3. The scanner according to claim 1, wherein the minimum size for the first local memory device is at least twice (2.times.) the maximum image size to be scanned.

4. The scanner according to claim 1, further comprising: a second image sensor configured to scan a second image of the second side of the sheet of media and generate second scanned image data.

5. The scanner according to claim 4, further comprising:
a platen; and
a document handler,
wherein first image sensor is located within the platen, and the second image sensor is located in the document handler.

6. The scanner according to claim 4, further comprising:
a first electronics module associated with the first image sensor that is coupled to a main scanner electronics module, and
a second electronics module associated with the second image sensor that is coupled to the main scanner electronics module.

7. The scanner according to claim 4, further comprising:
a first electronics module that is coupled to a main scanner electronics module, and
a second electronics module associated with the second image sensor that is coupled to the first electronics module.

8. The scanner according to claim 7, wherein the first electronics module comprises a first controller configured to steer image data from the first and second electronics modules to the main scanner electronic module.

9. The scanner according to claim 1, wherein the main memory device is configured to store the first scanned image data along with first image size data.

10. The scanner according to claim 1, wherein the determined first image size is transmitted before its corresponding first scanned image data.

11. The scanner according to claim 1, wherein the mixed sized documents includes plural documents of at least two sizes.

12. The scanner according to claim 1, wherein each scanline includes a number of pixels depending on the resolution of the first image sensor.

13. A scanner configured to scan mixed sized documents comprising:
a first image sensor configured to scan a first image of a first side of a sheet of media to generate first scanned image data;
a first local memory device associated with the first image sensor that is configured to temporarily store the first scanned image data as it is being scanned by the first image sensor;
a first processor configured to analyze the first image data stored in the first local memory device and to determine the size of the first scanned image in both a slow scan direction and a fast scan direction; and
a main memory device associated with the scanner that is configured to receive the first scanned image data transmitted from the first local memory device and store the first scanned image data,
a second image sensor configured to scan a second image of the second side of the sheet of media and generate second scanned image data;
a second local memory device associated with the second image sensor that is configured to temporarily store the second scanned image data as it is being scanned by the second image sensor; and
a second processor configured to analyze the second scanned image data stored in the second local memory device and to determine the size of the second scanned image in both the slow scan direction and the fast scan direction,
wherein the first processor is configured to transmit the first scanned image data and the determined size to the main memory device once the size of the first scanned image is determined,
wherein the first scanned image data, provided by the first image sensor, comprises a series of scanlines, and
wherein the size of the first scanned image in the slow scan direction is determined based on the series of scanlines temporarily stored in the first local memory device.

14. A method of scanning mixed sized documents using a scanner comprising:
scanning, via a first image sensor, a first image of a first side of a sheet of media to generate first scanned image data;
temporarily storing the first scanned image data in a first local memory device as it is being scanned by the first image sensor;
determining, via a first processor that is operatively connected to the first local memory device, the size of the first scanned image in both a slow scan direction and a fast scan direction;
transmitting the temporarily stored first scanned image data and the determined size to a main memory device associated with the scanner once the first scanned image size is determined; and
storing the first scanned image data in the main memory device, wherein the first scanned image data, provided by the first image sensor, comprises a series of scanlines, and wherein the size of the first scanned image in the slow scan direction is determined based on the series of scanlines temporarily stored in the first local memory device.

15. The method according to claim 14, further comprising coupling the first local memory device to the main memory device so as transmit the first scanned image data from the first local memory device to the main memory device.

16. The method according to claim 14, wherein the minimum size for the first local memory device is at least twice (2.times.) the maximum image size to be scanned.

17. The method according to claim 14, further comprising:
scanning, via a second image sensor, a second image of the second side of the sheet of media to generate second scanned image data.

18. The method according to claim 17, further comprising: providing a document handler, wherein the second image sensor is located in the document handler and the first image sensor is located within a platen of the scanner.

19. The method according to claim 17, wherein a first electronics module associated with the first image sensor that is coupled to a main scanner electronics module, and a second electronics module associated with the second image sensor is coupled to the main scanner electronics module.

20. The method according to claim 17, wherein a first electronics module is coupled to a main scanner electronics module, and a second electronics module associated with the second image sensor is coupled to the first electronics module.

21. The method according to claim 20, further comprising: steering image data from the first and second electronics modules to the main scanner electronic module.

22. The method according to claim 14, further comprising: storing, in the main memory device, the first image size along with the first scanned image data.

23. A method of scanning mixed sized documents using a scanner comprising:
scanning, via a first image sensor, a first image of a first side of a sheet of media to generate first scanned image data;
temporarily storing the first scanned image data in a first local memory as it is being scanned by the first image sensor;
determining, via a first processor, the size of the first scanned image in both a slow scan direction and a fast scan direction;
transmitting the temporarily stored first scanned image data and the determined size to a main memory device associated with the scanner once the first scanned image size is determined; and
storing the first image data in the main memory device;
scanning, via a second image sensor, a second image of the second side of the sheet of media to generate second scanned image data; and
determining, via a second processor, the size of the second scanned image in both the slow scan direction and the fast scan direction,
wherein the first scanned image data, provided by the first image sensor, comprises a series of scanlines, and
wherein the size of the first scanned image in the slow scan direction is determined based on the series of scanlines temporarily stored in the first local memory device.

24. A method of scanning mixed sized documents using a scanner comprising:
scanning, via a first image sensor, a first image of a first side of a sheet of media to generate first scanned image data;
temporarily storing the first scanned image data in a first local memory as it is being scanned by the first image sensor;
determining, via a first processor, the size of the first scanned image in both a slow scan direction and a fast scan direction;
transmitting the temporarily stored first image data and the determined size to a main memory device associated with the scanner once the first scanned image size is determined; and
storing the first scanned image data in the main memory device;
scanning, via a second image sensor, a second image of the second side of the sheet of media to generate second scanned image data; and
temporarily storing, in a second local memory device, the second scanned image data as it is being scanned by the second image sensor,
wherein the first scanned image data, provided by the first image sensor, comprises a series of scanlines, and
wherein the size of the first scanned image in the slow scan direction is determined based on the series of scanlines temporarily stored in the first local memory device.

* * * * *